No. 840,905. PATENTED JAN. 8, 1907.
W. D. BURKE.
WATER CAROUSEL.
APPLICATION FILED APR. 24, 1906.

2 SHEETS—SHEET 1.

Attest,
H. J. Fletcher.
M. I. Smith.

Inventor,
Walter D. Burke.
By Higdon Longan
Attys.

No. 840,905. PATENTED JAN. 8, 1907.
W. D. BURKE.
WATER CAROUSEL.
APPLICATION FILED APR. 24, 1906.
2 SHEETS—SHEET 2.
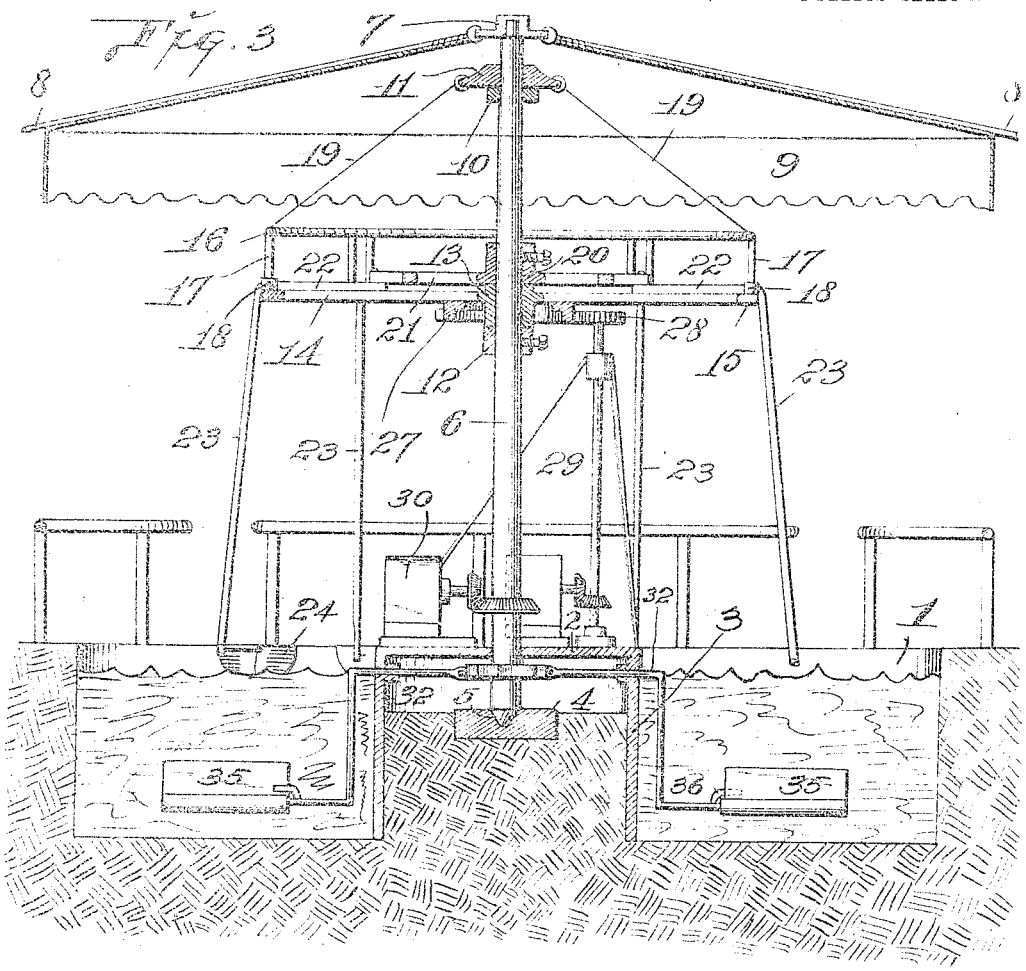
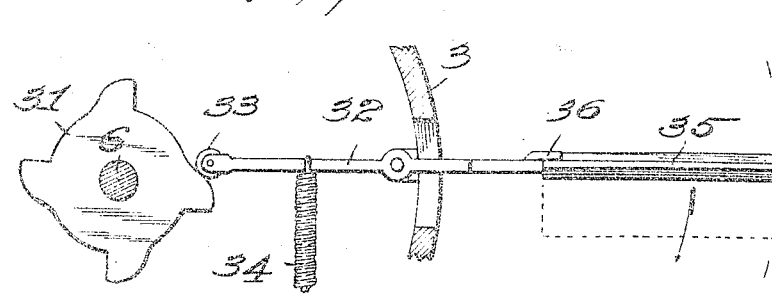
Attest,
H. J. Fletcher
M. P. Smith
Inventor
Walter D. Burke
By Rigdon & Longan
attys.

UNITED STATES PATENT OFFICE.

WALTER D. BURKE, OF ST. LOUIS, MISSOURI.

WATER-CAROUSEL.

No. 840,905.

Specification of Letters Patent.

Patented Jan. 8, 1907.

Application filed April 24, 1906. Serial No. 313,506.

*To all whom it may concern:*

Be it known that I, WALTER D. BURKE, a citizen of the United States, and a resident of St. Louis, Missouri, have invented certain new and useful Improvements in Water-Carousels, of which the following is a specification containing a full, clear, and exact description, reference being had to the accompanying drawings, forming a part hereof.

My invention relates to a water-carousel; and the object of my invention is to construct an amusement apparatus wherein a number of boats are caused to traverse a circular path in a small artificial lagoon or tank.

A further object of my invention is to provide a water-carousel with means whereby waves are created on the surface of the water, so as to give the boats passing through said water a rocking motion.

A further object of my invention is to arrange mechanism in a water-carousel for automatically moving the boats to and from the edge of the tank or lagoon to allow the occupants of said boats to enter and depart from said boats.

To the above purposes my invention consists of certain novel features of construction and arrangement of parts, which will be hereinafter more fully set forth, pointed out in the claims, and illustrated in the accompanying drawings, in which—

Figure 1:
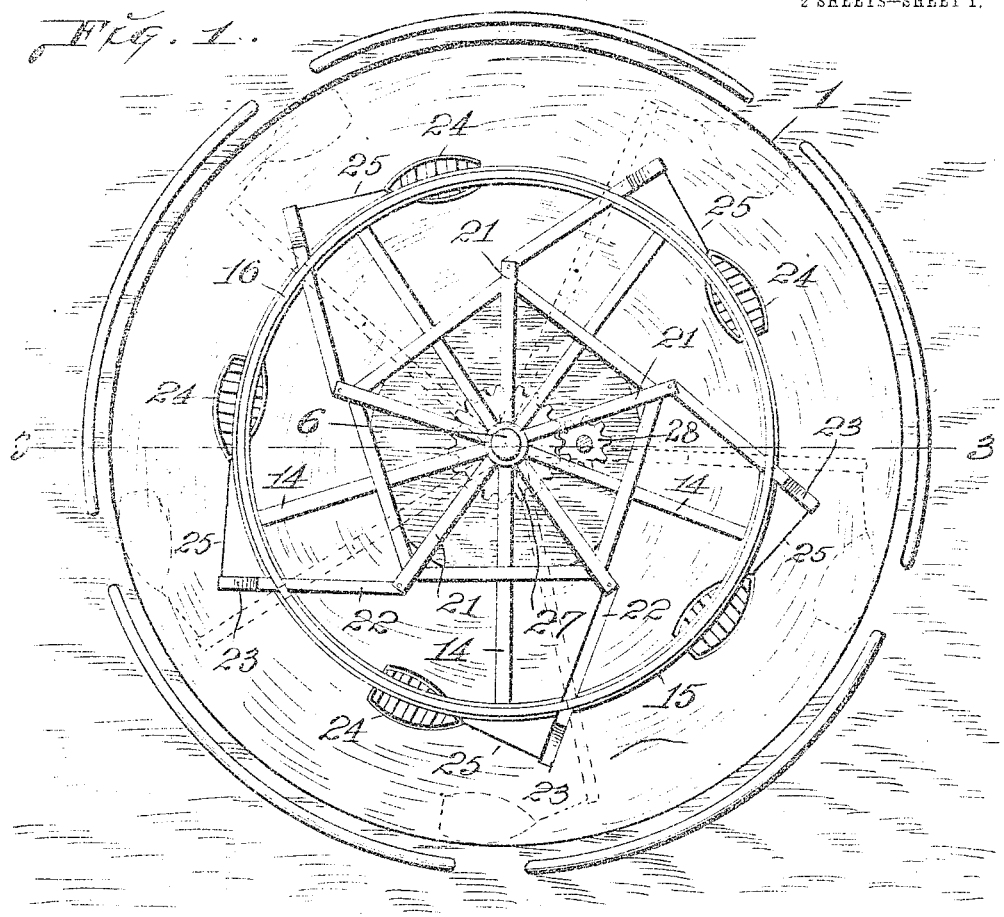
Figure 2:
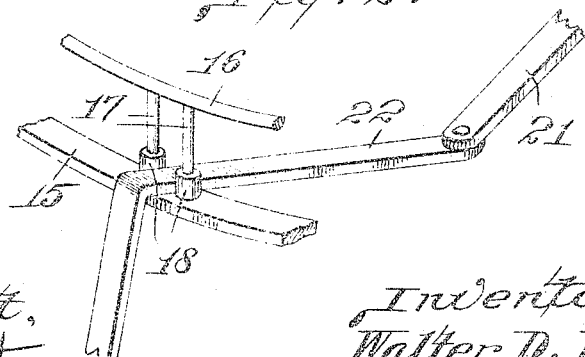

Figure 1 is a plan view of the water-carousel with the upper end of the centrally-arranged shaft in section. Fig. 2 is a detail perspective of a portion of the rotating cage of the carousel and a portion of one of the moving arms to which the boats are attached. Fig. 3 is a vertical section taken approximately on the line 3 3 of Fig. 1. Fig. 4 is an enlarged plan view, partly in section, of one of the wave-creating devices made use of in my improved carousel.

Referring by numerals to the accompanying drawings, 1 designates a tank or lagoon, preferably circular, which is formed in the ground and which is partially filled with water. Located in the center of this tank and in approximate alinement with the top of the ground is a circular platform 2, and extending downwardly from the edges thereof to the bottom of the tank is a wall 3. Located in the ground beneath the platform 2 and in the center of the tank 1 is a block 4, in the top side of which is formed a bearing 5, and arranged for rotation therein is the lower end of a vertically-disposed shaft 6. The upper end of this shaft is journaled in a cap 7, to which is fixed the inner ends of a series of radially-arranged guy-wires 8, the outer ends of which are fixed to posts (not shown) a suitable distance away from the tank 1. Supported by the guy-wires 8 and covering the entire tank 1 is a suitable canopy 9. Fixed on the shaft 6 a short distance below the cap 7 is a flange 10, and loosely mounted upon the shaft 6 above this flange 10 is a disk 11. Fixed upon the shaft 6 a suitable distance below the flange 10 is a ring 12, and loosely mounted upon the shaft and supported by this ring is a hub 13, to which is secured the inner ends of a series of radially-arranged arms 14, the outer ends of which are connected by a large ring 15. Horizontally disposed immediately above the ring 15 is a ring 16, and extending from said ring 16 downwardly to the ring 15 at suitable distances apart are the pairs of vertically-disposed rods 17, and loosely mounted on the lower ends thereof and on top of the ring 15 are the antifriction-rollers 18.

A series of guy wires or rods 19 are fixed to and extend from the ring 16 upwardly and are fixed to the disk 11. The hub 13, arms 14, rings 15 and 16, and the rods 17 form what I term a "cage" and which is supported by the ring 12 and is adapted to rotate independent of the shaft 6. Fixed upon the shaft 6 immediately above the hub 13 is a hub 20, and fixed thereto are the inner ends of a series of radially-arranged arms 21, which arms are somewhat shorter than are the arms 14, previously described. Pivotally mounted to the end of each arm 21 is the inner end of a horizontally-disposed arm 22, which arm extends outwardly over the ring 15 and between a corresponding pair of the antifriction-rollers 18. Each arm 22 extends or is bent downwardly, as indicated by 23, outside the ring 15, and the lower ends of all of the arms 23 terminate just above the surface of the water in the tank 1.

24 designates the boats, which traverse a circular path in the tank 1, and each boat is secured to the lower end of one of the arms 23 by means of a chain or cable 25.

Fixed in any suitable manner to the under sides of the arms 14 around the shaft 6 is a large gear-wheel 27. Meshing with this gear-wheel 27 is a pinion 28, which is fixed on the upper end of a vertically-disposed shaft 29, and which shaft is driven by a suitable motor located on the platform 2. A suitable motor, such as 30, is located on the platform 2 and is so connected to the shaft 6 as to impart rotary motion thereto. Fixed upon the shaft 6 beneath the platform 2 is a cam 31, and fulcrumed to the inside face of the wall 3 is a series of horizontally-disposed levers 32, the inner ends of which carry antifriction-rollers 33, which engage upon the edge of the cam 31. These levers 32 are held in position by suitably-arranged retractile coil-springs 34. The levers 32 extend outwardly through slots formed in the wall 3 and are then extended downwardly and thence horizontally in a plane slightly above the bottom of the tank 1. Loosely mounted on the extended lower ends of the levers 32 are blades 35, and fixed on the levers 32 are fingers 36, which are arranged to prevent the blades from swinging rearwardly past a vertical position.

The operation of my improved carousel is as follows: By means of the motor 30 rotary motion is imparted to the shaft 6, and the arms 21, carried by the hub 20, which is fixed to said shaft, will consequently rotate therewith. This action pulls the arms 22, which are fixed to the arms 21, inwardly over the ring 15 and between the antifriction-rollers 18 until the downwardly-extending arms 23 strike against the ring 15. Further movement of the arms 22 and 23 is impossible, and as a result the cage will be rotated with the shaft 6 and the boats 24 will be pulled around in a circular path in the tank 1. As the shaft 6 rotates the projections on the cam 31 bear against the rollers 33, carried by the levers 32, and as a result said levers are swung upon their pivot-points, and the blades 35 will be correspondingly moved in the water beneath the boats to agitate and create waves upon the water. The blades 35 assume vertical positions in being moved forwardly through the water, and when returned to their normal positions by the action of the retractile coil-springs 34 said blades will swing downwardly into horizontal planes, and thus travel through the water with little resistance. The ring 15 of the cage is of such a size as that when the arms 22 and 23 are drawn inwardly to their limit of movement and the carousel is in operation the boats traverse a path approximately midway between the circular platform 2 and the outer edge of the tank or lagoon 1. When it is desired to stop the carousel and bring the boats against the outer edge of the tank to permit the occupants of the boats to land, the motor 30 is cut off, so as to cease driving the shaft 6, and as the carousel gradually slows down the motor driving the shaft 29 is started, so as to cause the pinion 28 to drive the gear-wheel 27, and thus drive the entire cage at a higher rate of speed than the shaft 6 and arms 21 are traveling. This action moves the arms 23 and the outer portions of the arms 22 forwardly, and finally swings said arms 22 into positions in direct alinement with the arms 21, during which movement said arms 22 gradually move outwardly between the antifriction-rollers 18. (See dotted lines in Fig. 1.) The boats are now traversing a path immediately adjacent the outer edge of the tank 1, and when the carousel ceases to rotate the passengers can readily land from said boats.

A carousel of my improved construction comprises a minimum number of parts, can easily be set up for operation, can be operated at a minimum cost, and automatically moves the boats to and from the edge of the tank to facilitate loading and unloading.

I claim—

1. In a water-carousel, a tank, a vertically-disposed shaft in the center thereof, means whereby said shaft is driven, a cage supported by said shaft, a series of radially-arranged arms fixed on the shaft, and a series of boat-carrying arms pivotally connected to the outer ends of the radially-arranged arms and extending through the cage; substantially as specified.

2. In a water-carousel, a tank, a vertically-disposed shaft in the center thereof, means whereby said shaft is driven, a cage supported by said shaft, a series of radially-arranged arms fixed on the shaft, a series of boat-carrying arms pivotally connected to the outer ends of the radially-arranged arms and extending through the cage, and boats attached to the lower ends of said boat-carrying arms and which travel in the tank; substantially as specified.

3. In a water-carousel, a tank, a vertically-disposed shaft in the center thereof, means whereby said shaft is driven, a cage supported by said shaft, a series of radially-arranged arms fixed on the shaft, a series of boat-carrying arms pivotally connected to the outer ends of the radially-arranged arms, and wave-creating devices arranged in the bottom of the tank and actuated by the rotation of the shaft; substantially as specified.

4. In a water-carousel, a tank, a vertically-disposed shaft arranged in the center thereof, means whereby said shaft is driven, a series of radially-arranged arms fixed on said shaft adjacent the upper end thereof, a series of boat-carrying arms pivotally connected to the outer ends of the radially-arranged arms, a support for said boat-carrying arms, and means whereby said support is shifted independent of the shaft; substantially as specified.

In testimony whereof I have signed my name to this specifictaion in presence of two subscribing witnesses.

WALTER D. BURKE.

Witnesses:
M. P. SMITH,
E. L. WALLACE.